US010832669B2

(12) United States Patent
Park et al.

(10) Patent No.: US 10,832,669 B2
(45) Date of Patent: Nov. 10, 2020

(54) ELECTRONIC DEVICE AND METHOD FOR UPDATING CHANNEL MAP THEREOF

(71) Applicant: SAMSUNG ELECTRONICS CO., LTD., Suwon-si (KR)

(72) Inventors: Ji-hun Park, Suwon-si (KR); Myung-jae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 15/820,622

(22) Filed: Nov. 22, 2017

(65) Prior Publication Data

US 2018/0144745 A1 May 24, 2018

(30) Foreign Application Priority Data

Nov. 24, 2016 (KR) .................. 10-2016-0157544

(51) Int. Cl.
*G10L 15/22* (2006.01)
*H04N 21/482* (2011.01)
(Continued)

(52) U.S. Cl.
CPC .............. *G10L 15/22* (2013.01); *G10L 15/08* (2013.01); *G10L 15/30* (2013.01); *H04N 21/266* (2013.01);
(Continued)

(58) Field of Classification Search
CPC ......... G10L 15/22; G10L 15/08; G10L 15/30; G10L 2015/088; G10L 2015/223;
(Continued)

(56) References Cited

U.S. PATENT DOCUMENTS 8,560,324 B2 10/2013 Shin et al.
9,947,317 B2 * 4/2018 Kibre .................. G10L 15/075
(Continued)

FOREIGN PATENT DOCUMENTS

JP 5-313692 A 11/1993
KR 10-2009-0107365 A 10/2009
(Continued)

OTHER PUBLICATIONS

KIPO Machine English Translation of KR 10-1579530, 2015 (Year: 2015).*

(Continued)

*Primary Examiner* — Michelle M Koeth
(74) *Attorney, Agent, or Firm* — Sughrue Mion, PLLC

(57) ABSTRACT

An electronic device is provided. The electronic apparatus includes a communicator; a storage configured to store a channel map including a channel name, and a broadcasting frequency and a channel number corresponding to the channel name; and a processor to extract a first keyword from a first voice command and search the channel map for the first keyword, store the first keyword, extract a second keyword from a second voice command within a predetermined period of time of the first voice command, and search the channel map for the second keyword in response to the first keyword not being found in the channel map, and generate a control command to select a channel number corresponding to the second keyword in the channel map and add the first keyword as a pseudo channel name for the selected channel number in response to the second keyword being found in the channel map.

19 Claims, 7 Drawing Sheets

(51) Int. Cl.
*H04N 21/422* (2011.01)
*G10L 15/08* (2006.01)
*G10L 15/30* (2013.01)
*H04N 21/266* (2011.01)

(52) U.S. Cl.
CPC . *H04N 21/42203* (2013.01); *H04N 21/42206* (2013.01); *H04N 21/42221* (2013.01); *H04N 21/4823* (2013.01); *H04N 21/4828* (2013.01); *G10L 2015/088* (2013.01); *G10L 2015/223* (2013.01)

(58) Field of Classification Search
CPC ........... H04N 21/266; H04N 21/42203; H04N 21/42206; H04N 21/42221; H04N 21/4823; H04N 21/4828
See application file for complete search history.

(56) References Cited

U.S. PATENT DOCUMENTS

| | | | | |
|---|---|---|---|---|
| 10,403,277 | B2* | 9/2019 | Park | G06F 3/167 |
| 2003/0088399 | A1* | 5/2003 | Kusumoto | H04N 21/4394 704/10 |
| 2004/0207764 | A1* | 10/2004 | Naoi | H03J 1/0075 348/732 |
| 2010/0333163 | A1 | 12/2010 | Daly | |
| 2011/0283324 | A1 | 11/2011 | Oh | |
| 2013/0024197 | A1 | 1/2013 | Jang et al. | |
| 2014/0123185 | A1* | 5/2014 | Nam | H04N 21/4394 725/38 |
| 2014/0351273 | A1* | 11/2014 | Yoon | G06F 16/33 707/754 |
| 2015/0201246 | A1 | 7/2015 | Son et al. | |
| 2016/0125883 | A1* | 5/2016 | Koya | G10L 15/30 704/232 |
| 2016/0179801 | A1* | 6/2016 | Venkataraman | G06F 16/48 707/771 |
| 2017/0256260 | A1 | 9/2017 | Jeong | |

FOREIGN PATENT DOCUMENTS

| | | | | |
|---|---|---|---|---|
| KR | 10-2012-0010818 | A | 2/2012 | |
| KR | 10-2014-0055502 | A | 5/2014 | |
| KR | 10-1434515 | B1 | 8/2014 | |
| KR | 10-1579530 | | * 12/2015 | ........... B60R 16/037 |
| KR | 10-2016-0029450 | A | 3/2016 | |
| WO | 2014/069820 | A1 | 5/2014 | |

OTHER PUBLICATIONS

EPO/Google Machine English Translation of KR 10-1579530, 2015 (Year: 2015).*
International Search Report (PCT/ISA/210) dated Feb. 27, 2018, issued by the International Searching Authority in International Application No. PCT/KR2017/012359.
Written Opinion (PCT/ISA/237) dated Feb. 27, 2018, issued by the International Searching Authority in International Application No. PCT/KR2017/012359.
Communication dated Feb. 26, 2019, issued by the European Patent Office in counterpart European Application No. 17874181.5.
Communication dated Sep. 24, 2019, issued by the European Patent Office in counterpart European Application No. 17 874 181.5.
Communication dated Feb. 27, 2020, issued by the European Patent Office in counterpart European Application No. 17874181.5.

* cited by examiner

| Region : North America-Canada, Zipcode : L5N0B9, MSO : Shaw Direct, Headend Name : Shaw Direct Eastern Time Zone Digital, Source Type : STB, Service Type : Satellite, Released : On Service, ID : 307250 ||||
|---|---|---|---|
| LCN | Source ID | Channel Name | Alias |
| ⋮ | | ⋮ | |
| 73 | 34914 | ABC Spark HDTV | HABCS, ABC Spark HD |
| 74 | 38230 | Family jr. (HD) | - |
| 77 | 36235 | Cartoon Network HDTV | CNHD, Cartoon Network HD |
| 79 | 30943 | W Network HDTV (East) | W HD, W East HD |
| 80 | 42973 | Slice TV HDTV | - |
| 81 | 42768 | Lifetime Canada HDTV | - |
| 82 | 33914 | Bravo Canada HDTV | BRVHD, Bravo, Bravo HD |
| ⋮ | | ⋮ | |

| DEVICE ID | DATE | TIME | LOG CLASSIFICATION | RECOGNITION RESULT | EXECUTION COMMAND |
|---|---|---|---|---|---|
| ... | ... | ... | ... | ... | ... |
| 72a7889fa45b00d678248e571359b6c4ddcede12 | 2016-07-08 | 17:55:04 | RECOGNITION RESULT | TUNE TO HOME AND GARDEN TV | RECOGNITION SUCCESS |
| 72a7889fa45b00d678248e571359b6c4ddcede12 | 2016-07-08 | 17:55:04 | EXECUTION RESULT | TUNE TO HOME AND GARDEN TV | NO EXECUTION COMMAND |
| 72a7889fa45b00d678248e571359b6c4ddcede12 | 2016-07-08 | 17:55:11 | RECOGNITION RESULT | TUNE TO HGTV | RECOGNITION SUCCESS |
| 72a7889fa45b00d678248e571359b6c4ddcede12 | 2016-07-08 | 17:55:11 | EXECUTION RESULT | TUNE TO HGTV | EXECUTE CHANNEL CONVERSION |
| ... | ... | ... | ... | ... | ... |

FIG. 6

| DEVICE ID | DATE | TIME | LOG CLASSIFICATION | RECOGNITION RESULT | EXECUTION COMMAND |
|---|---|---|---|---|---|
| ... | ... | ... | ... | ... | ... |
| 46845f3aa228b545f47d603c55fe9e858e8f2dda | 2016-07-10 | 14:22:03 | RECOGNITION RESULT | HOME AND GARDEN TV | RECOGNITION SUCCESS |
| 46845f3aa228b545f47d603c55fe9e858e8f2dda | 2016-07-10 | 14:22:03 | EXECUTION RESULT | HOME AND GARDEN TV | NO EXECUTION COMMAND |
| 46845f3aa228b545f47d603c55fe9e858e8f2dda | 14:22:08 | 14:22:03 | RECOGNITION RESULT | HOME AND GARDEN TELEVISION | RECOGNITION SUCCESS |
| 46845f3aa228b545f47d603c55fe9e858e8f2dda | 14:22:08 | 14:22:03 | EXECUTION RESULT | HOME AND GARDEN TELEVISION | EXECUTE CHANNEL CONVERSION |
| ... | ... | ... | ... | ... | ... |

ELECTRONIC DEVICE AND METHOD FOR UPDATING CHANNEL MAP THEREOF

CROSS-REFERENCE TO RELATED APPLICATION

This application claims priority from Korean Patent Application No. 10-2016-0157544, filed on Nov. 24, 2016 in the Korean Intellectual Property Office, the disclosure of which is incorporated herein by reference in its entirety.

BACKGROUND

Field

Apparatuses and methods consistent with exemplary embodiments relate to an electronic device and a method for updating a channel map thereof, and more particularly, to an electronic device configured to perform voice recognition and a method for updating a channel map thereof.

Related Art

With recent developments in voice recognition and intention analysis technology, user voices are increasingly used to interface with electronic devices such as televisions (TVs) and smart phones.

Searching broadcast contents and channel control account for a high proportion of voice recognition services provided by TVs and other electronic devices.

Channel control may be performed by a user uttering the channel number or the channel name.

In the case of controlling the channel by uttering the channel name, a channel name database may be provided by a broadcasting business operator. Here, the channel name database may include mapping data between channel names and channel numbers.

The channel map is searched for a channel name corresponding to the channel name uttered by the user, and the channel number mapped thereto is used to perform a channel change.

Therefore, in the case of using the channel map, conversion to the corresponding channel may only be performed when the channel name recognized from the user's voice is registered in the channel map.

However, since there are hundreds of channels being provided and users may utter a channel name in different manners, such as different names or different patterns, there is a technical problem in which usability of voice recognition may deteriorate when only a limited number of channel names are supported.

SUMMARY

One or more exemplary embodiments may overcome the aforementioned problems and other disadvantages not described above. However, it is understood that one or more exemplary embodiment are not required to overcome the disadvantages described above, and may not overcome any of the problems described above.

According to an aspect of an exemplary embodiment, there is provided an electronic device, including: a communicator; a storage configured to store a channel map including a channel name, a broadcasting frequency corresponding to the channel name, and a channel number corresponding to the channel name; and a processor configured to extract a first keyword from a first voice command received through the communicator and search the channel map for the first keyword, store the first keyword, extract a second keyword from a second voice command received through the communicator within a predetermined period of time of the first voice command, and search the channel map for the second keyword in response to the first keyword not being found in the channel map, and generate a control command to select a selected channel number corresponding to the second keyword in the channel map and add the first keyword as a pseudo channel name for the selected channel number in response to the second keyword being found in the channel map.

The processor may be further configured to control the storage to temporarily store the first keyword.

The electronic device may further include a buffer, and the processor may be further configured to store the first keyword in the buffer.

The processor may be further configured to determine a degree of similarity between the first keyword and the second keyword, and add the first keyword as the pseudo channel name for the selected channel number in response to the degree of similarity being greater than a predetermined threshold value.

The electronic device may further include a display, and the processor may be further configured to tune the selected channel number based on the control command and control a broadcasting program provided from the selected channel number to be displayed on the display.

The processor may be further configured to determine whether the first keyword is identical to a third keyword extracted from a third voice command received through the communicator after the first keyword is added as the pseudo channel name, search the channel map for the channel number corresponding to the first keyword added as the pseudo channel name, and generate the control command to change to the selected channel number.

The processor may be further configured to control the communicator to transmit the first keyword to a server, and the server may be configured to update the channel map stored in the server using the first keyword.

The server may be further configured to update the channel map stored in the server using the first keyword in response to receiving the first keyword at least a predetermined number of times.

The pseudo channel name may be different from the channel name.

According to an aspect of another exemplary embodiment, there is provided method, performed by an electronic device, for updating a channel map including a channel name, a broadcasting frequency corresponding to the channel name, and a channel number corresponding to the channel name, the method including: receiving a first signal corresponding to a first voice command; extracting a first keyword from the first signal; searching the channel map for the first keyword; storing the first keyword in response to the first keyword not being found in the channel map; extracting a second keyword from a second voice command received within a predetermined period of time of the first voice command; searching the channel map for the second keyword; generating a control command to select a selected channel number corresponding to the second keyword in the channel map; and adding the first keyword as a pseudo channel name for the selected channel number in response to the second keyword being found in the channel map.

The storing may include temporarily storing the first keyword.

The storing may include storing the first keyword in a buffer of the electronic device.

The adding may include determining a degree of similarity between the first keyword and the second keyword; and adding the first keyword as the pseudo channel name for the selected channel number in response to the degree of similarity being greater than a predetermined threshold value.

The method may further include: changing to the selected channel number based on the control command; and displaying a broadcasting program provided from the selected channel number on a display of the electronic device.

The method may further include: determining whether the first keyword is identical to a third keyword extracted from a third voice command received after the first keyword is added as the pseudo channel name; searching the channel map for the channel number corresponding to the first keyword added as the pseudo channel name; and generating the control command to change to the selected channel number.

The method may further include transmitting the first keyword to a server, and the server may update the channel map stored in the server using the first keyword.

The server may update the channel map stored in the server using the first keyword in response to receiving the first keyword at least a predetermined number of times.

The pseudo channel name may be different from the channel name.

According to an aspect of yet another exemplary embodiment, there is provided a non-transitory computer readable recording medium having embodied thereon a program, which when executed by a processor of an electronic device causes the electronic device to execute a method for updating a channel map including a channel name, a broadcasting frequency corresponding to the channel name, and a channel number corresponding to the channel name, the method including: receiving a first signal corresponding to a first voice command; extracting a first keyword from the first signal; searching the channel map for the first keyword; storing the first keyword in response to the first keyword not being found in the channel map; extracting a second keyword from a second voice command received within a predetermined period of time of the first voice command; searching the channel map for the second keyword; generating a control command to select a selected channel number corresponding to the second keyword in the channel map; and adding the first keyword as a pseudo channel name for the selected channel number in response to the second keyword being found in the channel map.

BRIEF DESCRIPTION OF THE DRAWINGS

The above and/or other aspects will be more apparent by describing exemplary embodiments with reference to the accompanying drawings, in which:

FIG. 2 is a view illustrating a channel map according to an exemplary embodiment;

FIGS. 5 and 6 are views provided to explain a method for updating a channel map according to an exemplary embodiment.

DESCRIPTION OF EXEMPLARY EMBODIMENTS

Figure 1:
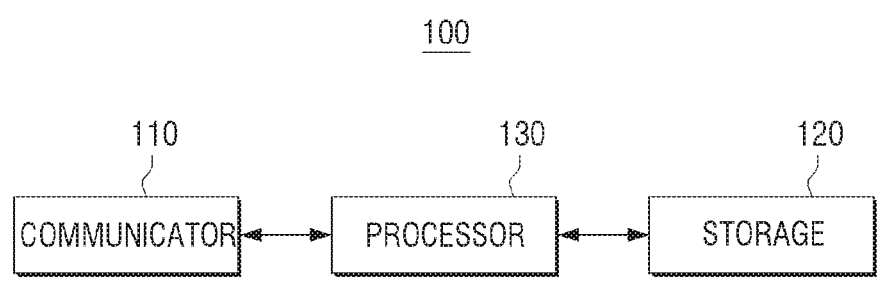
FIG. 1 is a block diagram provided to explain a configuration of an electronic device according to an exemplary embodiment.

Hereinbelow, the present disclosure will be explained in further detail with reference to the drawings.

The terms used in the present disclosure are general terms selected that are currently widely used as much as possible while considering their functions in the present disclosure, but these may differ depending on the intentions or precedents of a person skilled in the art, or emergence of a new technology and the like. Further, in certain cases, they may be terms that have been arbitrarily selected by the applicant, in which case their meanings will be explained in detail in their corresponding detailed description. Therefore, the terms used in the present disclosure should not be defined as simply references, but should be defined based on the meanings of those terms and the overall contents of the present disclosure.

Throughout the specification, terms such as "include/including" and "consists of"/consisting of should be construed as designating that there are such characteristics, numbers, steps, operations, elements, components or a combination thereof in the specification, not to exclude the presence or possibility of adding one or more of other characteristics, numbers, steps, operations, elements, components or a combination thereof. In the exemplary embodiments, a "module" or "unit" performs at least one function or operation, and may be realized as hardware or software or a combination thereof.

Hereinafter, exemplary embodiments will be described in detail with reference to the drawings attached such that they may be easily carried out by a person skilled in the art. However, the present disclosure may be realized in various forms, and is not limited to the exemplary embodiments described herein. Further, in the drawings, any portion irrelevant to clearly describing the present disclosure is omitted, and throughout the specification, like reference numerals indicate like elements.

According to various exemplary embodiments, an electronic device may be realized as a display device, or a server and the like.

First, cases where the electronic device is realized as a display device will be explained hereinbelow. In such cases, display devices may include TVs, but this is exemplary, and thus the display devices may include various forms of devices such as smart phones, tablets, wearable devices, set top boxes and the like.

FIG. 1 is a block diagram provided to explain a configuration of an electronic device according to an exemplary embodiment.

Referring to FIG. 1, the electronic device 100 includes a communicator 110, a storage 120 and a processor 130.

The communicator 110 may be a transceiver, and may perform communication with an electronic device including a microphone.

Here, the electronic device may obtain a voice uttered by a user through the microphone, convert the obtained voice into electric signals, and transmit the converted electric signals to the electronic device 100. In this case, the electronic device may be realized as a remote control or as a separate device configured to control the electronic device 100. Accordingly, the communicator 110 may receive signals regarding the uttered voice of the user.

For this purpose, the communicator 110 may perform communication with the electronic device in various wireless communication methods. For example, the communicator 110 may perform communication with the electronic device according to various communication methods such as WiFi, Bluetooth, Bluetooth low energy and the like. However, this is just an exemplary embodiment, and thus the communicator 110 may perform communication with the electronic device through various wireless communication methods such as IrDA (infrared data association), UWB (Ultra Wideband), NFC (Near Field Communication) and the like, or through a wired communication method.

The storage 120 stores a channel map that includes channel names allocated to broadcasting frequencies and channel numbers corresponding to the channel names.

Here, the channel map includes the channel names determined by broadcasting stations, and the channel numbers through which users may view the broadcasting services being provided through the channels. Meanwhile, the channel names and channel numbers included in the channel map may differ depending on the broadcasting station that provides terrestrial broadcasting, cable broadcasting, IPTV, satellite broadcasting and the like, the broadcasting business operator and the region where the electronic device 200 is located.

FIG. 2 illustrates a channel map according to an exemplary embodiment. Referring to FIG. 2, the channel map may include information 224 on the region and broadcasting business operator and the like.

Further, the channel map includes mapping information on how the channel name 222 and channel number 221 are mapped.

Specifically, the channel map includes channel names such as "ABC Spark HDTV", "Family Jr. (HD)", "Cartoon Network HDTV", "W Network HDTV (East)", "Slice TV HDTV", "Lifetime Canada HDTV" and "Bravo Canada HDTV", and local channel numbers (LCN) 73, 74, 77, 79, 80, 81 and 82 through which broadcasting services are provided by different channels, are mapped in the channel map.

Meanwhile, the channel map may further include a pseudo channel name (or Alias) 223. Here, the pseudo channel name 223 may include a channel name except for the channel name set by the broadcasting station in the channel map, having the possibility of being uttered by the user for indicating the channel name. That is, the pseudo channel name 223 may include various modified forms of channel names that a user may usually utter and call to indicate a certain channel.

For example, referring to FIG. 2, the pseudo channel names for "ABC Spark HDTV" are "HABCS" and "ABC Spark HD", the pseudo channel names for "Cartoon Network HDTV" are "CNHD" and "Cartoon Network HD", the pseudo channel names for "W Network HDTV (East)" are "W HD" and "W East HD", and the pseudo channel names for "Bravo Canada HDTV" are "BRVHD", "Bravo" and "Bravo HD".

As mentioned hereinabove, the channel names, pseudo channel names and channel numbers may be mapped to each other and stored in the channel map.

Meanwhile, because a user may not necessarily utter the channel name set by a broadcasting station but utter the channel name in various forms when intending to change a channel through voice, a pseudo channel name is stored in the channel map in order to consider the various uttering patterns of the user. However, because it is difficult to consider every uttering pattern of every user with only the pseudo channel names pre-stored in the channel map, the pseudo channel names are updated based on the voice uttered by the user.

Meanwhile, the pseudo channel name may or may not be included in the channel map depending on the circumstances. Further, only pseudo channel names of at least a portion of the channel names included in the channel map, may exist.

Meanwhile, the channel map may be provided from the server. That is, the channel map may be downloaded from the server and then stored in the storage 120.

The processor 130 controls the overall operations of the electronic device 100. For example, the processor 130 may drive an operating system or application program to control the hardware or software elements connected to the processor 130, and perform various data processing and operations. Further, the processor 130 may load a command or data received from at least one of the other elements to a volatile memory and process the loaded command or data, and store various data in a nonvolatile memory.

For this purpose, the processor 130 may be realized as an exclusive use processor configured to perform a certain operation (for example: embedded processor) or a generic-purpose processor (for example: CPU or application processor) configured to perform the aforementioned operations by executing one or more software programs stored in a memory device.

First, the processor 130, using the communicator 110, may download a channel map from the server. In this case, because the channel names and channel numbers included in the channel map may differ depending on the broadcasting business operator and the region where the electronic device 100 is located and the like, the processor 130 may download, using the communicator 110, the channel map corresponding to the broadcasting business operator set in the electronic device 100 and the region where the electronic device 100 is located, and store the downloaded channel map in the storage 120.

For this purpose, the processor 130, using the communicator 110, may transmit to the server the information on the broadcasting business operator and the region together with a request to transmit the channel map, and receive from the server the channel map corresponding to the broadcasting business operator set in the electronic device and the region where the electronic device 100 is located. Otherwise, if the information on the broadcasting business operator and the region of the electronic device 100 is pre-stored in the server, the server may transmit the channel map to the electronic device 100 in response to the request to transmit the channel map even if the information on the broadcasting business operator and the region is not received from the electronic device 100.

Further, when a signal regarding a voice uttered by the user is received through the communicator 110, the processor 130 may convert the uttered voice into a text through voice recognition.

Specifically, the processor 130 may convert the uttered voice into a text (or a character string) using an STT (Speech To Text) algorithm. Here, the STT algorithm is a module configured to convert a voice signal into a text. Various types of conventional voice recognition algorithms may be used in the present disclosure.

In this case, the processor 130 may display the converted text on a display of the electronic device 100.

Thereafter, the processor 130 may extract (or obtain) a first keyword from a first signal received through the communicator 110.

That is, when a signal regarding an uttered voice is received, the processor 130 may convert the uttered voice into a text, and then use the text converted from the uttered voice to determine the user's intention of utterance contained in the uttered voice and extract a keyword from the uttered voice.

Here, if the user's intention of utterance is channel change, the keyword may be a channel name or a pseudo channel name.

For example, explanation will be made hereinbelow based on an assumption that the text converted from the uttered voice is "tune to ○○".

In this case, the processor 130 may determine that the text "tune to ○○" is a type of sentence that is related to a "request", and determine that the user's intention of utterance corresponds to a "request" for "channel change" to "○○".

Further, if the user's intention of utterance is channel change, the processor 130 may extract "○○0", that represents the channel name to which the user wants to convert to, as a keyword (that is, a channel name keyword).

Meanwhile, various conventional well-known methods may be used to analyze the user's intention of utterance and extract the keyword.

Thereafter, the processor 130 may search a channel number that corresponds to the extracted first keyword in the channel map.

Specifically, the processor 130 may search the channel map to determine whether there is a channel name or a pseudo channel name that corresponds to the keyword extracted from the text, and if there is such a channel name or a pseudo channel name, the processor 130 may determine the channel number mapped to the channel name or the pseudo channel name.

For example, explanation will be made hereinbelow based on an assumption that the channel map is as illustrated in FIG. 2, and the keyword extracted from the uttered voice is "ABC Spark HDTV".

In this case, the processor 130 may search the channel map and determine that the channel name corresponding to the keyword extracted from the uttered voice is "ABC Spark HDTV", and determine channel number 73, that is the channel number mapped to "ABC Spark HDTV", as the channel number corresponding to the keyword.

As another example, explanation will be made hereinbelow based on an assumption that the channel map is as illustrated in FIG. 2, and the keyword extracted from the uttered voice is "ABC Spark TV".

In this case, the processor 130 may search the channel map and determine that the pseudo channel name corresponding to the keyword extracted from the uttered voice is "ABC Spark TVC", and determine channel number 73, that is the channel number mapped to "ABC Spark TV", as the channel number corresponding to the keyword.

However, if there is no channel name or pseudo channel name corresponding to the keyword extracted from the text in the channel map, a channel number corresponding to the keyword will not searched.

For example, explanation will be made hereinbelow based on an assumption that the channel map is as illustrated in FIG. 2, and the keyword extracted from the uttered voice is "ABC Spark".

In this case, because there is no channel name or pseudo channel name corresponding to "ABC Spark" even upon searching the channel map, a channel number corresponding to "ABC Spark" is not searched.

Meanwhile, if a channel number is searched, the processor 130 may generate a control command to change the channel to the searched channel number. Further, the processor 130 may change the channel to the searched channel number based on the control command, and display the broadcasting program being provided through the changed channel on the display of the electronic device 100. In this case, various control commands for controlling the electronic device 100, may be stored in the storage 120.

In the above example, because the channel number searched according to the keyword is 73, the processor 130 may generate a control command to select a channel of which a channel number is 73, control a receiver according to the control command to receive the broadcasting program being provided through the frequency allocated to channel number 73, display images of the received broadcasting program through the display, and output audio regarding the received broadcasting program through a speaker.

However, even when the intention of utterance is channel change, if a channel number is not searched because there is no channel name or pseudo channel name corresponds to the keyword extracted from the text in the channel map, a channel number cannot be specified, and thus a control command is not generated.

Here, if there is no channel number searched as corresponding to the extracted first keyword, the processor 130 may store the extracted first keyword. That is, if there is no channel number searched as corresponding to the extracted first keyword, the processor 130 may store the extracted keyword.

In this case, the processor 130 may control such that the extracted keyword is temporarily stored in the storage 120. That is, the processor 130 may store the extracted keyword in the storage 120, and delete the keyword from the storage 120 after a certain period of time.

Further, the electronic device 100 may further include a buffer. In this case, the processor 130 may store the extracted keyword in the buffer.

Meanwhile, the processor 130 may extract a second keyword from a second signal that is received through the communicator 110 within a predetermined period of time because the first signal is received through the communicator 110, search a channel number corresponding to the extracted second keyword in the channel map, and generate a control command to change the channel to the searched channel number.

Specifically, if a signal of an uttered voice is received through the communicator 110 but a channel number corresponding to the signal is not searched and then a signal of an uttered voice is received through the communicator 110 within a predetermined period of time, the processor 130 may perform voice recognition on the signal received within the predetermined period of time, determine the user's intention of utterance contained in the uttered voice using the text converted from the uttered voice by voice recognition, and extract a keyword from the uttered voice.

Thereafter, the processor 130 may determine whether there exists, in the channel map, a channel name or a pseudo channel name, corresponding to the keyword, determine the channel number mapped to the channel name or the pseudo channel name, corresponding to the keyword, and generate a control command for changing the channel to that channel number. Further, the processor 130 may control the electronic device 100 to perform a channel change according to the control command.

Hereinbelow, explanation will be made on a method for determining the intention of utterance through voice recognition and extracting a keyword, and generating a control command according to extracted keyword.

Here, the processor 130 may add a stored first keyword as a pseudo channel name for a searched channel number.

Specifically, the processor 130 may add the keyword extracted from the previous uttered voice received within the predetermined period of time before receiving the current uttered voice, as the pseudo channel name for the channel name corresponding to the keyword extracted from the current uttered voice.

Here, the previous uttered voice received within the predetermined period of time prior to receiving the current uttered voice may be an uttered voice received right before receiving the current uttered voice, or may include a plurality of uttered voices received within the predetermined period of time before receiving the current uttered voice.

That is, the user utters a voice that includes a channel name, for a channel change to a certain channel. Here, if the electronic device 100 does not perform a channel change operation to the corresponding channel, the user generally perceives that a wrong channel name has been uttered, and thus the user utters another channel name indicating the same channel until the channel change is performed.

Here, unless a channel change is performed, it is considered that the channel name uttered by the user does not exist in the channel map but that the channel name is a channel name that the user normally uses to indicate the corresponding channel. Therefore, if the channel map is updated using the keyword extracted from a previous uttered voice, received prior to the current utterance of vice, for which a normal channel change has been performed, then a more efficient channel change may be performed.

Accordingly, the processor 130 updates the channel map using the keyword extracted from the previous uttered voice, received within the predetermined period of time prior to receiving the current utterance of voice, for which a normal channel change has been performed.

Here, the processor 130 may determine a degree of similarity between the stored first keyword and the extracted second keyword, and if the determined degree of similarity is greater than a predetermined threshold value, the processor 130 may add the stored first keyword as a pseudo channel name for the channel number searched according to the extracted second keyword.

Specifically, the processor 130 determines the degree of similarity between the first keyword and the second keyword using various character string similarity degree measurement algorithms such as the algorithm for measuring Levenshtein Distance, and if the degree of similarity between the first keyword and the second keyword is greater than the predetermined threshold value, the processor 130 may add the first keyword as the pseudo channel name for the channel number searched according to the extracted second keyword.

Here, the Levenshtein Distance Measurement Algorithm refers to an algorithm configured to measure a distance indicating how different two character strings are, that is an algorithm configured to measure the minimum number of times necessary to change from one character string to the other character string by inserting, deleting or substituting a character.

Accordingly, the processor 130 may measure the degree of similarity between the first keyword and the second keyword using the character string similarity degree measurement algorithm, and determine whether the degree of similarity between the first keyword and the second keyword is greater than the predetermined threshold value.

Meanwhile, the processor 130 may make a database stored with words that have different expressions but are normally used as synonyms, and use this database when determining the degree of similarity between keywords.

Further, because there are many cases where a channel name is expressed in an abbreviated form, if the keyword consists of a plurality of words, the processor 130 may determine the degree of similarity between the character of the first character of each word of the keyword and the character included in the other keyword.

As explained hereinabove, from previous uttered voices having a keyword that is different from the keyword extracted from the current uttered voice, if there is a keyword having similarity with the keyword extracted from the current uttered voice, the keyword extracted from the previous uttered voice may be added as the pseudo channel name for the channel name corresponding to the keyword extracted from the current uttered voice.

That is, even if a previous uttered voice was received within the predetermined period of time prior to performing a channel change, the channel to which the user intended channel change according to the previous uttered voice may be different from the channel to which the user intended channel change by the current uttered voice, and therefore, the channel map will be updated using the keyword extracted from the previous uttered voice only when there is similarity between the two uttered voices.

Meanwhile, the processor 130 may generate a control command for channel change, after adding a stored keyword as a pseudo channel name. That is, the processor 130 may update the channel map by adding the stored first keyword as the pseudo channel name, and then generate a control command for channel change to the channel number searched according to the second keyword.

Otherwise, the processor 130 may generate the control command for channel change, and then add the stored keyword as the pseudo channel name. That is, the processor 130 may generate the control command for channel change to the channel number searched according to the keyword, and then add the stored first keyword as the pseudo channel name.

Otherwise, the process of adding the stored first keyword as the pseudo channel name and the process of generating the control command according to the second keyword may be performed simultaneously.

Meanwhile, if, after adding an extracted first keyword as a pseudo channel name, a keyword extracted from a third signal received through the communicator 110 is identical to the first keyword, the processor 130 may search for the channel number corresponding to the keyword extracted from the channel map based on the first keyword added as the pseudo channel name, and generate a control command to change the channel to the searched channel number.

That is, once a keyword, extracted from a previous uttered voice, is added to the pseudo channel name, that pseudo channel name becomes a subject for search, and thus, when an uttered voice having a keyword that is identical to the keyword extracted from the previous uttered voice and that the intention of utterance is channel change, is received again, the processor 130 may generate a control command for channel change according to the received uttered voice.

Hereinbelow, explanation will be made on a method for adding a keyword extracted from a previous uttered voice to the pseudo channel name, depending on the similarity between the keyword extracted from the previous uttered voice and the keyword extracted from the current uttered voice, and operations of channel change to be performed thereafter.

For example, explanation will be made hereinbelow based on an assumption that channel name "Home and Garden TV" is registered in the channel map.

First, if the user utters "tune to Home and Garden", the processor 130 may determine that the intention of utterance of the uttered voice "tune to Home and Garden" is a request for channel change to "Home and Garden", and extract "Home and Garden" as the keyword.

However, because the channel name is registered in the channel map as "Home and Garden TV", the processor 130 may search for a channel name corresponding to "Home and Garden" and determine that such a channel name does not exist. In this case, the processor 130 does not generate a control command for channel change, and does not perform a channel change operation according to the user's uttered voice of "tune to Home and Garden".

Here, the processor 130 may store "Home and Garden". That is, the processor 130 may store, in the storage 120, the keyword "Home and Garden" for which a channel number is not searched.

Meanwhile, because a channel change operation is not performed after uttering "tune to Home and Garden", the user may utter "tune to Home and Garden TV".

In this case, the processor 130 may determine that the intention of utterance of the uttered voice "tune to Home and Garden TV" is a request for channel change to "Home and Garden TV", and extract "Home and Garden TV" as a keyword.

Further, the processor 130 may search the channel map and determine that "Home and Garden TV" corresponding to the extracted keyword, exists, and if the channel number of "Home and Garden TV" is 22 for example, the processor 130 may change channel to channel number 22.

Meanwhile, the processor 130 determines the degree of similarity between "Home and Garden" that is the keyword extracted from the previous uttered voice and "Home and Garden TV", that is the keyword extracted from the uttered voice used to change the channel to channel number 22.

Here, the processor 130 may determine the degree of similarity between "Home and Garden" and "Home and Garden TV" using the character string similarity degree algorithm. In this case, in that "Home and Garden TV" becomes identical to "Home and Garden" if two characters are deleted, the processor 130 may determine that the degree of similarity between the two keywords is greater than the predetermined threshold value.

Accordingly, the processor 130 may update the channel map by adding "Home and Garden" as a pseudo channel name for "Home and Garden TV".

Further, when an uttered voice of "tune to Home and Garden" is received thereafter, the processor 130 may extract "Home and Garden" as a keyword, search the channel map and determine that the pseudo channel name, "Home and Garden", corresponding to the extracted keyword, exists, and generate a control command to change the channel to channel number 22 that is mapped to "Home and Garden", and perform a channel change to channel number 22 accordingly.

As another example, explanation will be made hereinbelow based on an assumption where channel name, "Home and Garden TV", is registered in the channel map.

First, if the user utters "tune to HGTV", the processor 130 may determine that the intention of utterance of the uttered voice, "tune to HGTV", is a request for channel change to "HGTV", and extract "HGTV" as a keyword.

However, because the channel is registered in the channel map as "Home and Garden TV", upon searching the channel map for a channel name corresponding to "HGTV", the processor 130 may determine that there is no channel name corresponding to "HGTV". In this case, the processor 130 does not generate a control command to change a channel, and does not perform a channel change operation according to the user's uttered voice "tune to HGTV".

Here, the processor 130 may store "HGTV". That is, the processor 130 may store, in the storage 120, the keyword, "HGTV", for which a channel number is not searched.

Meanwhile, because a channel change operation is not performed after uttering "tune to HGTV", the user may utter "tune to Home and Garden TV".

In this case, the processor 130 may determine that the intention of utterance of the uttered, "tune to Home and Garden TV", is a request for changing a channel to "Home and Garden TV", and extract "Home and Garden TV" as a keyword.

Further, the processor 130 may search the channel map and determine that channel name, "Home and Garden TV", corresponding to the extracted keyword, exists, and if the channel number of "Home and Garden TV" is 22 for example, the processor 130 may change the channel to channel number 22.

Meanwhile, the processor 130 determines the degree of similarity between "HGTV" that is the keyword extracted from the previous uttered voice, and "Home and Garden TV" that is the keyword extracted from the uttered voice used to change the channel to channel number 22.

Here, the processor 130 may combine the first character of each word included in "Home and Garden TV" to generate "HAGTV", and determine the degree of similarity between "HAGTV" and "HGTV" using the character string similarity degree algorithm. In this case, in that "HAGTV" becomes identical to "HGTV" if one character is removed, the processor 130 may determine that the degree of similarity between these two keywords is greater than the predetermined threshold value.

Accordingly, the processor 130 may update the channel map by adding "HGTV" as a pseudo channel name for channel name "Home and Garden TV".

Further, when an utterance, "tune to HGTV", is received thereafter, the processor 130 may extract "HGTV" as a keyword, and search the channel map, determine that pseudo channel name, "HGTV", corresponding to the extracted keyword, exists, generate a control command to change the channel to channel number 22 that is mapped to "HGTV", and perform a channel change to channel number 22 accordingly.

As another example, explanation will be made hereinbelow based on an assumption that channel name, "Home and Garden TV", is registered in the channel map.

First, when the user utters "tune to Home and Garden television", the processor 130 may determine that the intention of utterance of the uttered voice, "tune to Home and Garden television", is a request for changing a channel to "Home and Garden television", and extract "Home and Garden television" as a keyword.

However, because the channel name is registered in the channel map as "Home and Garden TV", the processor 130 may search the channel map for a channel name corresponding to "Home and Garden television", and determine that a channel name corresponding to "Home and Garden television" does not exist. In this case, the processor 130 does not generate a control command for channel change, and does not perform a channel change operation according to the user's uttered voice, "tune to Home and Garden television".

Here, the processor 130 may store "Home and Garden television". That is, the processor 130 may store, in the storage 120, the keyword, "HGTV", for which a channel number is not searched.

Meanwhile, because a channel change operation is not performed upon uttering "tune to Home and Garden television", the user may utter "tune to Home and Garden TV".

In this case, the processor 130 may determine that the intention of utterance for the uttered voice, "tune to Home and Garden TV", is a request for changing a channel to "Home and Garden TV", and extract "Home and Garden TV" as a keyword.

Further, the processor 130 may search the channel map and determine that the channel name, "Home and Garden TV", corresponding to the extracted keyword, exists, and if the channel number of "Home and Garden TV" is 22 for example, the processor 130 may change the channel to channel number 22.

Meanwhile, the processor 130 determines the degree of similarity between "Home and Garden television" that is the keyword extracted from the previous uttered voice, and "Home and Garden TV" that is the keyword extracted from the uttered voice used to change the channel to channel number 22.

Here, the processor 130 may determine that "television" and "TV" have the same meaning based on the database of synonyms, substitute "television" to "TV", and then determine the degree of similarity between the keywords using the character string similarity degree algorithm. In this case, in that the keywords are identical to each other as "television" is substituted to "TV", the processor 130 may determine that the degree of similarity between these keywords is greater than the predetermined threshold value.

Accordingly, the processor 130 may update the channel map by adding "Home and Garden television" as a pseudo channel name for channel name, "Home and Garden TV".

Further, when an utterance, "tune to Home and Garden television", is received thereafter, the processor 130 may extract "Home and Garden television" as a keyword, search the channel map and determine that "Home and Garden television" corresponding to the extracted keyword, exists, generate a control command to change the channel to channel number 22 mapped to "Home and Garden television", and perform a channel change to channel number 22 accordingly.

Meanwhile, even if an uttered voice that includes a keyword having a degree of similarity lower than the predetermined threshold value is received between a uttered voices that include a keyword having a degree of similarity that is greater than the predetermined threshold value, the channel map may be updated using only the keyword included in the uttered voice that includes the keyword having a degree of similarity that is greater than the predetermined threshold value.

For example, explanation will be made hereinbelow based on an assumption where, with channel name, "Home and Garden TV", registered in the channel map, uttered voices, "tune to HGTV", "tune to KDTV" and "tune to Home and Garden TV" are received sequentially.

In this case, because "HGTV" and "KDTV" are channel names that do not exist in the channel map, the processor 130 may store these keywords in the storage 120.

Further, the processor 130 may determine the channel number mapped to "Home and Garden TV" in the channel map, and perform a channel change to the channel number.

Thereafter, the processor 130 determines the degree of similarity between "HGTV" and "KDTV" and "Home and Garden TV".

Here, the processor 130 may combine the first characters of each word included in "Home and Garden TV" to generate "HAGTV", and determine the degree of similarity between "HAGTV" and "HGTV" using the character string similarity degree algorithm. In this case, in that "HAGTV" becomes identical to "HGTV" if one character is removed, the processor 130 may determine that the degree of similarity between these keywords is greater than the predetermined threshold value.

However, in that insertion, deletion and substitution must be performed numerous times for "KDTV" to become identical to "Home and Garden TV", the processor 130 may determine that the degree of similarity between these keywords is below the predetermined threshold value.

Accordingly, from previous uttered voices received prior to the current uttered voice "tune to Home and Garden TV", the processor 130 may add only "HGTV" that is a keyword extracted from "tune to HGTV", as a pseudo channel name for "Home and Garden TV", thereby updating the channel map.

Meanwhile, the processor 130 may control the communicator 110 to transmit a first keyword to the server so that the channel map stored in the server is updated. That is, the processor 130 may control the communicator 110 to transmit the keyword added as the pseudo channel name to the server.

Accordingly, the server may update the channel map stored in the server using the first keyword received from the electronic device 100.

Specifically, the server may receive the keyword from not only the electronic device 100 but also from a plurality of electronic devices configured to perform the same functions as the electronic device 100.

Here, if the first keyword is received from the electronic device 100 and the plurality of electronic devices a predetermined times or more, the server may update the channel map stored in the server using the first keyword. That is, in a case where the same keyword is received from the electronic device 100 and the plurality of electronic devices for the predetermined number of times or more, the server may update the channel map stored in the server.

Specifically, the server may determine the channel name of which the degree of similarity with the keyword is greater than the predetermined threshold value, and add the keyword as a pseudo channel name for the determined channel name. Otherwise, the server may receive from the electronic device 100 and the plurality of electronic devices information on the channel name of which the degree of similarity with the keyword is the predetermined threshold value or above, or receive information on the channel number mapped thereto, and add the keyword as the pseudo channel name.

Further, the server may transmit the channel map to the electronic device 100 and the plurality of electronic devices in response to a request to transmit the channel map.

Meanwhile, in the aforementioned example, it was explained that the operation of performing voice recognition and the operation of extracting a keyword is performed in the electronic device 100, but this is just an exemplary embodiment, and thus such operations may be performed in the server.

In this case, the server may include a voice recognition server configured to perform voice recognition and an intention analysis server configured to determine the intention of utterance and to extract a keyword. However, this is just an example, and thus the operation of performing voice recognition and the operation of determining the intention of utterance and extracting a keyword may be performed through one server.

Specifically, when a signal regarding an uttered voice of the user is received through the communicator 110, the processor 130 may control the communicator 110 to transmit the signal to the voice recognition server.

In this case, the voice recognition server may convert the uttered voice to a text using an STT algorithm, and transmit the converted text to the analysis server.

Meanwhile, the intention analysis server may determine the intention of utterance of the user, included in the uttered voice using the text converted from the uttered voice, and extract a keyword from the uttered voice.

Further, the intention analysis server may transmit the intention of utterance and the keyword extracted from the uttered voice to the electronic device 100.

In this case, the processor 130 may search the channel map based on the keyword received from the intention analysis server, and may perform a channel change operation or a channel map update depending on whether a channel name or a pseudo channel name, corresponding to the keyword, exists.

Meanwhile, according to various exemplary embodiments, if a channel name or a pseudo channel name, corresponding to the keyword, does not exist in the channel map, a channel number is not searched, and thus the electronic device 100 does not perform the channel change operation.

Here, the processor 130 may control the communicator 110 to transmit the keyword to the server. In this case, the server determines a channel name or a pseudo channel name, corresponding to the keyword in the channel map stored in the server, and if there is a channel name or a pseudo channel name, corresponding to the keyword, the server may determine the channel number mapped thereto, and transmit the determined channel number to the electronic device 100.

In this case, when the channel number is received from the server, the processor 130 may add the keyword as the pseudo channel name mapped to the channel number, and perform a channel change operation to that channel.

Figure 3:
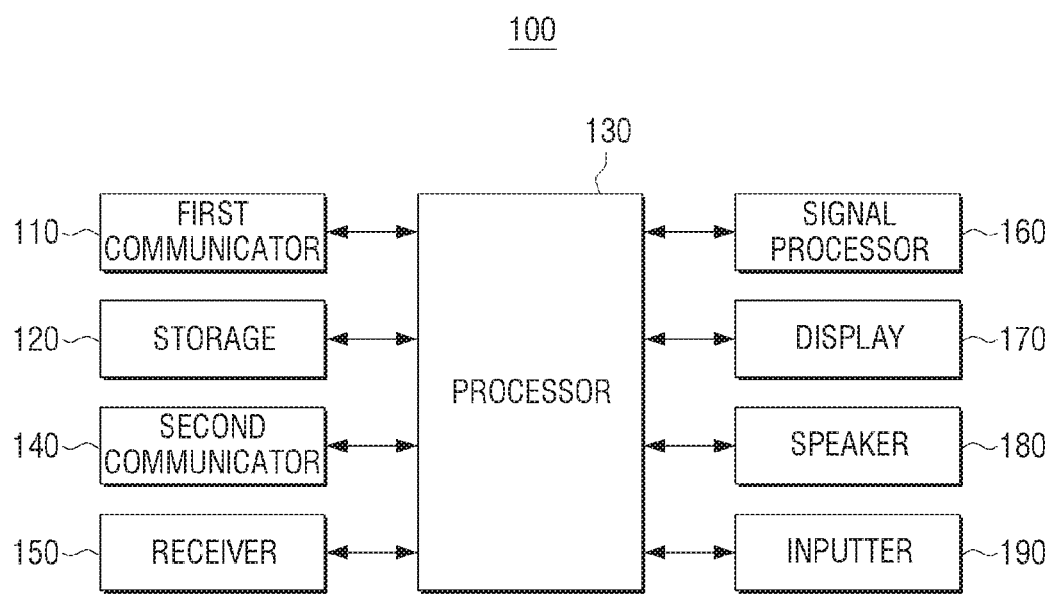
FIG. 3 is a block diagram provided to explain a detailed configuration of an electronic device according to an exemplary embodiment.

FIG. 3 is a block diagram provided to explain a detailed configuration of an electronic device according to an exemplary embodiment.

Referring to FIG. 3, the electronic device 100 may include a first communicator 110, a storage 120, a processor 130, a second communicator 140, a receiver 150, a signal processor 160, a display 170, a speaker 180 and an inputter 190, and these elements may be controlled by the processor 130.

Meanwhile, the first communicator 110, the storage 120 and the processor 130 perform the same functions as the communicator 110, the storage 120 and the processor 130, illustrated in FIG. 1, and thus repeated explanation on these elements will be omitted.

The storage 120 may store a command or data received from the processor 130 or other elements (for example: the first communicator 110, the storage 120, the second communicator 140, the receiver 150, the signal processor 160, the display 170, the speaker 180 and the inputter 190, etc.), or generated by the processor 230 or the other elements.

Further, the storage 120 may include programming modules such as for example, kernel, middleware, application programming interface (API) and the like. Each of the aforementioned programming modules may consist of software, firmware, hardware, or a combination of at least two thereof.

Meanwhile, the storage 120 may include a storage realized by the storage 120, ROM, RAM and SoC; a memory card (for example, a micro SD card, a USB memory) mounted onto the electronic device 100; and an external storage (for example, a USB memory etc.) connectable to the electronic device 100. Further, the storage 120 may include a nonvolatile memory, a volatile memory, an HDD (hard disk drive) or an SSD (solid state drive).

The second communicator 140 performs communication with the server. Specifically, the second communicator 140 may be connected to a network through various types of communication methods, and perform communication with the server through the network. For this purpose, the second communicator 140 may include a communication module for performing wired Ethernet, wireless LAN communication and the like.

Accordingly, the processor 130 may perform communication with the server through the second communicator 140, and transceive various information (for example, channel map, etc.) to and from the server.

The receiver 150 receives a broadcasting program. Specifically, the receiver 150 may receive the broadcasting program being provided from a broadcasting station or a broadcasting business operator through terrestrial broadcasting, cable broadcasting, IPTV and satellite broadcasting, etc.

In the case of receiving contents from a broadcasting station or broadcasting business operator, the receiver 150 may be realized in the form of including an element such as a tuner, demodulator, and an equalizer and the like. However, this is exemplary, and the receiver 150 may be realized in various forms.

The signal processor 160 performs signal processing on broadcasting programs so that the broadcasting programs received through the receiver 150 may be output.

Specifically, the signal processor 160 may perform various image processing such as decoding, scaling, noise filtering, frame rate conversion, resolution conversion and the like on a video signal included in broadcasting contents, to convert the video signal into a video signal having the form that may be output from the display 170. Further, the signal processor 160 may perform various signal processing such as decoding, amplifying, noise filtering and the like on an audio signal included in a broadcasting content, to convert the audio signal into an audio signal having the form that may be output from the speaker 180.

The display 170 is an element configured to output various video signals processed in the signal processor 160. The display 170 may be realized as an LCD (Liquid Crystal Display), an OLED (Organic Light Emitting Display) or a PDP (Plasma Display Panel), and display images of broadcasting programs and the like.

The speaker 180 is an element configured to output not only various video signals but also various alarm sounds, voice messages and the like. For example, the speaker 180 may output audio of broadcasting programs.

The inputter 190 receives various user inputs for controlling the electronic device 100 and transmits the received user inputs to the processor 130.

In this case, the inputter 190 may be realized as an IR receiver configured to receive remote control signals being transmitted from remote controls for controlling electronic devices 100. In some cases, the inputter 190 may be realized as an input panel provided in the electronic device 100. Here, the input panel may be made as a touch pad, a key pad provided with various function keys, number keys, character keys and the like, or as a touch screen.

The inputter 190 may receive various user inputs for controlling the functions of the electronic device 100. For example, when the electronic device 200 is realized as a TV, the electronic device 200 may receive user manipulations for controlling the functions of the TV, such as power on/off, channel change, volume control and the like. In this case, the processor 130 may control other elements to execute other functions corresponding to user manipulations input through the inputter 190.

Meanwhile, in the aforementioned example, it was explained that a separate electronic device such as a remote control obtains a voice uttered by the user and that the electronic device transmits the obtained uttered voice to the electronic device 100, but this is just an example, and thus the electronic device 100 may directly obtain the voice uttered by the user through the microphone provided in the electronic device 100, and perform operations according to the uttered voice.

Meanwhile, the electronic device may be realized as a server, and hereinbelow, explanation will be made based on an assumption that the electronic device is realized as the server.

Figure 4:
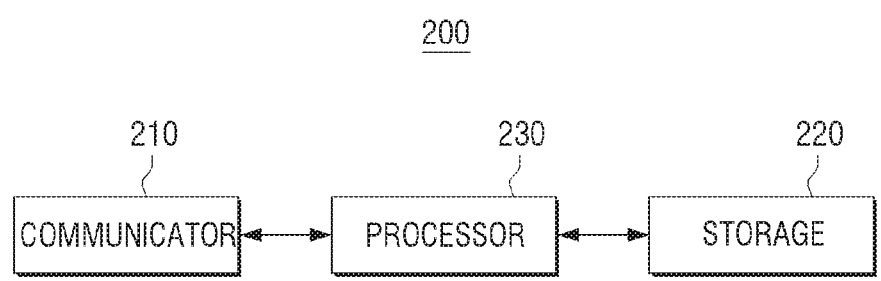
FIG. 4 is a block diagram provided to explain a configuration of an electronic device according to an exemplary embodiment.

FIG. 4 is a block diagram provided to explain a configuration of an electronic device according to an exemplary embodiment.

Referring to FIG. 4, the electronic device 200 includes a communicator 210, a storage 220 and a processor 230.

The communicator 210 performs communication with an electronic device. In this case, the electronic device may be realized as a TV, smart phone, tablet, wearable device, set top box and the like.

Specifically, the communicator 210 may be connected to a network through various types of communication methods, and perform communication with the electronic device through the network. For this purpose, the communicator 210 may include a communication module for performing wired Ethernet, wireless LAN communication and the like.

The storage 220 stores a channel map that includes channel names allocated to broadcasting frequencies, and channel numbers corresponding to the channel names.

In this case, the storage 220 may store a plurality of channel maps. That is, in that the channel names and channel numbers included in the channel map may differ depending on the broadcasting business operator and the region where the electronic device 100 is located, the storage 220 may store channel maps matched accordingly per broadcasting business operator and region.

Meanwhile, because the channel map was explained hereinabove, specific explanation will be omitted.

The processor 230 controls the overall operations of the electronic device 200. For example, the processor 230 may drive an operating system or application program to control the hardware or software elements connected to the processor 230, and perform various data processing and operations. Further, the processor 230 may load a command or data received from at least one of the other elements to a volatile memory and process the loaded command or data, and store various data in a nonvolatile memory.

For this purpose, the processor 230 may be realized as an exclusive use processor configured to perform a certain operation (for example: embedded processor) or a generic-purpose processor (for example: CPU or application processor) configured to perform the aforementioned operations by executing one or more software programs stored in a memory device.

First, the processor 230 may control the communicator 210 to transmit the channel map to the electronic device.

Specifically, when information on the broadcasting business operator set in the electronic device and the region where the electronic device is located is received from the electronic device, the processor 230 may determine the channel map matching the information on the broadcasting business operator and the region of the electronic device, from among the plurality of channel maps stored in the storage 220, and transmit the corresponding channel map to the electronic device through the communicator 210.

When a signal of a voice uttered by the user is received through the communicator 210, the processor 230 may convert the uttered voice into a text through voice recognition.

That is, the electronic device may obtain the voice uttered by the user through the microphone installed in the electronic device, and transmit the obtained uttered voice to the electronic device 200. Otherwise, the electronic device may receive the uttered voice that a separate electronic device such as a remote control obtained, and transmit the received uttered voice to the electronic device 200.

Accordingly, the processor 230 may receive the signal for the uttered voice of the user through the communicator 110, and convert the uttered voice into a text through voice recognition.

Specifically, the processor 230 may convert the uttered voice into a text (or a character string) using an STT (Speech To Text) algorithm. Here, the STT algorithm is a module configured to convert a voice signal into a text. Various types of conventional voice recognition algorithms may be used in the present disclosure.

Thereafter, the processor 230 may extract a first keyword from a first keyword received through the communicator 210.

That is, when a signal regarding an uttered voice is received, the processor 230 may convert the uttered voice into a text, and then use the text converted from the uttered voice to determine the user's intention of utterance contained in the uttered voice and extract a keyword from the uttered voice.

Here, if the user's intention of utterance is channel change, the keyword may be a channel name or a pseudo channel name.

Thereafter, the processor 230 may search the channel map for the channel number that corresponds to the extracted first keyword.

In this case, the channel map may be the channel map that corresponds to the broadcasting business operator set in the electronic device and the region.

Specifically, the processor 230 may search the channel map to determine whether there is a channel name or a pseudo channel name that corresponds to the keyword extracted from the text, and if there is such a channel name or a pseudo channel name, the processor 230 may determine the channel number mapped to that channel name or the pseudo channel name.

When the channel number is searched as aforementioned, the processor 230 may generate a control command to change the channel to the searched channel number, and transmit the control command to the electronic device through the communicator 210. Accordingly, the electronic device may perform a channel change operation to the corresponding channel according to the control command received from the electronic device 200.

However, if there is no channel name or pseudo channel name, corresponding to the keyword extracted from the text upon searching the channel map, the channel number corresponding to the keyword cannot be searched.

That is, if there is no channel name or pseudo channel name, corresponding to the keyword extracted from the text, is searched, and thus a channel number is not searched, the processor 230 does not generate a control command. Otherwise, the processor 230 may generate a control command for a channel change, not including a channel number.

Here, if a channel number corresponding to the extracted first keyword is not searched, the processor 130 may store the extracted first keyword. That is, if a channel number corresponding to the extracted keyword is not searched, the processor 230 may store the extracted keyword.

In this case, the processor 230 may control such that the extracted keyword is temporarily stored in the storage 220. That is, the processor 230 may store the extracted keyword in the storage 220, and delete the keyword from the storage 220 after a certain period of time.

Further, the electronic device 200 may further include a buffer. In this case, the processor 230 may store the extracted keyword in the buffer.

Meanwhile, if a channel number corresponding to the extracted keyword is not searched, the processor 230 may control the communicator 210 to transmit the extracted keyword together with the control command for changing a channel, not including the channel number, to the electronic device through the communicator 210.

In this case, the electronic device may determine a channel name or a pseudo channel name, corresponding to the keyword, in the channel map stored in the electronic device, and if there is such a channel name or a pseudo channel name, corresponding to the keyword, the electronic device may determine the channel number mapped thereto, and perform a channel change operation to the determined channel number.

Meanwhile, the processor 230 may extract a second keyword from a second signal that is received through the communicator 210 within a predetermined period of time because the first signal is received through the communicator 210, search the channel map for the channel number that corresponds to the extracted second keyword, and generate a control command to change the channel to the searched channel number.

Specifically, if a signal regarding an uttered voice is received through the communicator 210 but a channel number corresponding to the signal is not searched and then a signal regarding an uttered voice is received through the communicator 210 within a predetermined period of time, the processor 230 may perform voice recognition on the signal received within the predetermined period of time, determine the user's intention of utterance contained in the uttered voice using the text converted from the uttered voice by voice recognition, and extract a keyword from the uttered voice.

Thereafter, the processor 230 may determine whether there exists, in the channel map, a channel name or a pseudo channel name, corresponding to the keyword, determine the channel number mapped to the channel name or the pseudo channel name corresponding to the keyword, and generate a control command for changing to that channel. Further, the processor 230 may control the communicator 210 to transmit the control command to the electronic device through the communicator 210.

Here, the processor 230 may add the stored first keyword as a pseudo channel name for the searched channel number.

Specifically, the processor 230 may add the keyword extracted from the previous uttered voice received within the predetermined period of time prior to receiving the current uttered voice, as the pseudo channel name for the channel name corresponding to the keyword extracted from the current uttered voice.

Here, the previous uttered voice received within the predetermined period of time prior to receiving the current uttered voice may be the uttered voice received right before receiving the current uttered voice, or may include a plurality of uttered voices received within the predetermined period of time prior to receiving the current uttered voice.

Here, the processor 230 may determine the degree of similarity between the stored first keyword and the extracted second keyword, and if the determined degree of similarity is greater than a predetermined threshold value, the processor 230 may add the stored first keyword as the pseudo channel name for the channel number searched according to the extracted second keyword.

Specifically, the processor 230 determines the degree of similarity between the first keyword and the second keyword using various character string similarity degree measurement algorithms such as the algorithm for measuring Levenshtein Distance, and if the degree of similarity between the first keyword and the second keyword is greater than the predetermined threshold value, the processor 230 may add the first keyword as the pseudo channel name for the channel number searched according to the extracted second keyword.

Accordingly, the processor 230 may measure the degree of similarity between the first keyword and the second keyword using the character string similarity degree measurement algorithm, and determine whether the degree of similarity between the first keyword and the second keyword is greater than the predetermined threshold value.

Meanwhile, the processor 230 may make a database stored with words that have different expressions but are normally used as synonyms, and use the database when determining the degree of similarity between keywords.

Further, because there are many cases where a channel name is expressed in an abbreviated form, if the keyword consists of a plurality of words, the processor 230 may determine the degree of similarity between the character string of the first character of each word of the subject keyword and the character string included in the other keyword.

Meanwhile, the processor 230 may generate a control command for channel change, after adding a stored keyword as a pseudo channel name.

That is, the processor 230 may update the channel map by adding the stored first keyword as the pseudo channel name, and then generate the control command for changing a channel to the channel number searched according to the second keyword.

Otherwise, the processor 230 may generate the control command for channel change, and then add the stored keyword as the pseudo channel name. That is, the processor 230 may generate the control command for changing the channel to the channel number searched according to the keyword, and then add the stored first keyword as the pseudo channel name.

Otherwise, the process of adding the stored first keyword as the pseudo channel name and the process of generating the control command according to the second keyword may be performed simultaneously.

Meanwhile, if, after adding an extracted first keyword as a pseudo channel name, a keyword extracted from a third signal received through the communicator 210 is identical to the first keyword, the processor 230 may search the channel number corresponding to the keyword extracted from the channel map based on the first keyword added as the pseudo channel name, and generate a control command to change the channel to the searched channel number.

That is, once a keyword, extracted from a previous uttered voice, is added to the pseudo channel name, that pseudo channel name becomes a subject for search, and thus, when an uttered voice having a keyword that is identical to the keyword extracted from the previous uttered voice and that the intention of utterance is channel change, is received again, the processor 230 may generate a control command for channel change according to the received uttered voice.

Meanwhile, the method for determining the intention of utterance of the uttered voice, extracting a keyword from the uttered voice, and generating a control command according to the keyword or updating the channel map, is identical to the method explained with reference to FIG. 1.

Meanwhile, when a keyword is received from the electronic device, the processor 230 may update the channel map.

Specifically, the processor 230 may receive the keyword from the electronic device and a plurality of electronic devices configured to perform the same functions as the electronic device.

Here, the processor 230 may determine the channel name of which the degree of similarity with the keyword is greater than the predetermined threshold value, and add the keyword as a pseudo channel name for the determined channel name. Otherwise, the processor 230 may receive from the electronic device and the plurality of electronic devices information on the channel name of which the degree of similarity with the keyword is greater than the predetermined threshold value, or receive information on the channel number mapped thereto, and add the keyword as the pseudo channel name.

Further, the processor 230 may control the communicator 210 to transmit the channel map to the electronic device 100 and the plurality of electronic devices in response to a request to transmit the channel map.

Meanwhile, in the aforementioned example, it was explained that the operation of performing voice recognition, determining the intention of utterance and extracting a keyword, searching the channel number corresponding to the keyword, and generating a control command for channel change and updating the channel map accordingly is performed through one electronic device 200.

However, this is just an example, and thus the electronic device 200 may include a voice recognition server, an intention analysis server, and a search server.

The electronic device may transmit a signal regarding the uttered voice of the user to the voice recognition server. In this case, the electronic device may transmit the information on the broadcasting business operator and the region of the electronic device to the voice recognition server.

The voice recognition server may convert the uttered voice into a text using an STT algorithm, and transmit the converted text to the analysis server. Further, the voice recognition server may transmit the information on the broadcasting business operator and the region of the electronic device to the intention analysis server.

Meanwhile, the intention analysis server may determine the intention of utterance of the user, included in the uttered voice using the text converted from the uttered voice, and extract a keyword from the uttered voice.

Further, the intention analysis server may transmit the intention of utterance and the keyword extracted from the uttered voice to the search server. Further, the intention analysis server may transmit the information on the broadcasting business operator and the region of the electronic device to the search server.

The search server may determine the channel map corresponding to the information on the broadcasting business operator and the region of the electronic device, from among the plurality of channel maps stored in the search server, and search the channel number corresponding to the keyword in the corresponding channel map.

Specifically, the search server may search the channel map to determine whether there is a channel name or a pseudo channel name, corresponding to the keyword, and if there is such a channel name or a pseudo channel name, corresponding to the keyword, the search server may determine the channel number mapped to that channel name or the pseudo channel name, and transmit the corresponding channel number to the intention analysis server.

However, if there is no channel name or pseudo channel name, corresponding to the keyword, the search server may transmit information, indicating that a channel number is not searched, to the intention analysis server.

Meanwhile, when the channel number is received from the search server, the intention analysis server may generate a control command to change the channel to the channel number, and transmit the control command to the electronic device. Accordingly, the electronic device may perform a channel change operation based on the control command received from the intention analysis server.

However, if information, indicating that no channel number is searched, is received from the search server, the intention analysis server may not generate a control command.

Further, if the information, indicating that no channel number is searched, is received from the search server, the intention analysis server may generate a control command not including a channel number, and transmit the control command not including a channel number and the extracted keyword to the electronic device.

In this case, the electronic device may search the channel map to determine whether there is a channel name or a pseudo channel name, corresponding to the keyword, and if there is such a channel name or a pseudo channel name, corresponding to the keyword, the electronic device may determine the channel number mapped to that channel name or pseudo channel name, and perform a channel change operation to the determined channel number.

Meanwhile, if a channel number is not searched, the search server may store the keyword.

Thereafter, when a keyword is received from the intention analysis server, the search server may determine whether there is a channel name or a pseudo channel name, corresponding to the keyword, in the channel map, and if there is such a channel name or a pseudo channel name, corresponding to the keyword, the search server may search for the channel number and transmit the searched channel number to the intention analysis server.

Further, the search server may add the stored keyword as a pseudo channel name for the searched channel number based on the degree of similarity between the stored keyword and the keyword for which the channel number is searched.

FIGS. 5 and 6 are views provided to explain a method for updating a channel map according to an exemplary embodiment.

Hereinbelow, explanation will be made based on an assumption that the electronic device configured to perform a channel change operation is realized as a TV.

FIG. 5 illustrates a case where channel name, "HGTV", is registered, but a separate pseudo channel name for "HGTV" is not registered in the channel map.

First, if the user utters "tune to home and garden tv", voice recognition for the uttered voice is performed, but because "home and garden tv", extracted from the corresponding utterance, is not registered in the channel map, "home and garden tv" is not searched in the channel map. Accordingly, TV does not perform a channel change operation according to "tune to home and garden tv" uttered by the user.

Here, "home and garden tv", a keyword not existing in the channel map, may be stored.

Thereafter, if the user utters "tune to hgtv", voice recognition for the uttered voice is performed, and because "HGTV", extracted from the corresponding utterance, is registered in the channel map as a channel name, the channel number broadcasting "HGTV" is searched. Accordingly, in response to a control command to change the channel to the searched channel number, a channel change is performed to channel HGTV.

In this case, in that the degree of similarity between "home and garden tv" and "hgtv" is greater than the predetermined threshold value, "home and garden tv" may be added as a pseudo channel name mapped to "HGTV". Accordingly, even if the user utters "tune to home and garden tv" thereafter, channel change may be made to channel HGTV.

FIG. 6 illustrates a case where channel name, "HGTV", is registered in the channel map as a channel name, and "home and garden television" as a pseudo channel name for "HGTV".

First, if the user utters "tune to home and garden tv", voice recognition for the uttered voice is performed, but because "home and garden tv", extracted from the corresponding utterance, is not registered in the channel map, "home and garden tv" is not searched in the channel map. Accordingly, the TV does not perform a channel change operation according to "tune to home and garden tv" uttered by the user.

Thereafter, if the user utters "home and garden television", voice recognition for the uttered voice is performed, and because "home and garden television", extracted from the corresponding utterance, is registered in the channel map as a pseudo channel name for "HGTV", the channel number broadcasting "HGTV" may be searched. In this case, in response to the control command to change the channel to the searched channel number, the TV performs a channel change to channel HGTV.

In this case, in that the degree of similarity between "home and garden tv" and "home and garden television" is greater than the predetermined threshold value, "home and garden tv" may be added as a pseudo channel name mapped to "HGTV". Accordingly, even if the user utters "tune to home and garden tv" thereafter, channel change may be made to channel HGTV.

Figure 7:
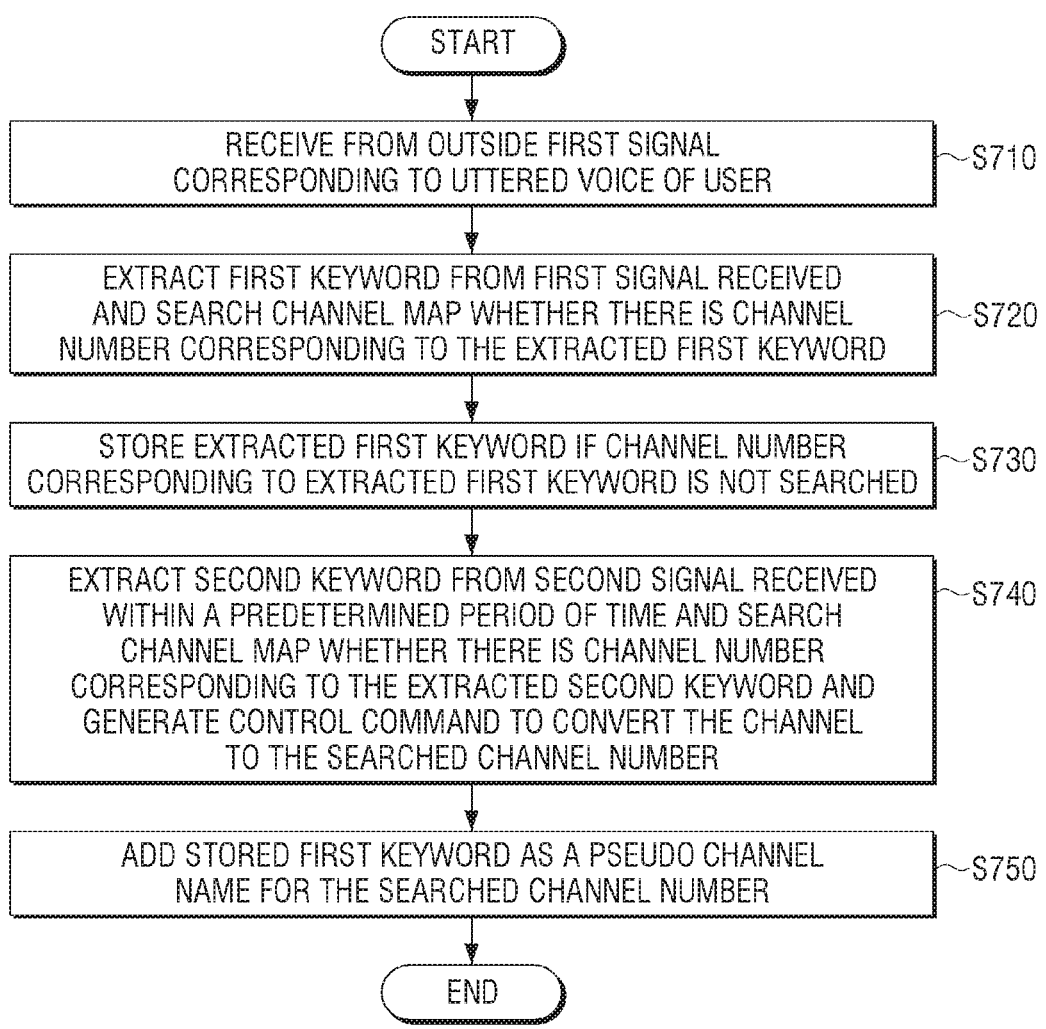
FIG. 7 is a flowchart provided to explain a method for updating a channel map of an electronic device according to an exemplary embodiment.

FIG. 7 is a flowchart provided to explain the method for updating a channel map of an electronic device according to an exemplary embodiment.

In this case, the electronic device may include the channel map that includes channel names allocated to broadcasting frequencies and channel numbers corresponding to the channel names.

First, a first signal, corresponding to an uttered voice of a user, is received (S710).

Thereafter, a first keyword is extracted from the received first signal, and the channel map is searched to find whether there is a channel number corresponding to the extracted first keyword (S720).

Further, if no channel number, corresponding to the extracted first keyword, is searched, the extracted first keyword is stored (S730). In this case, the extracted keyword may be stored temporarily and may be stored in a buffer of the electronic device.

Further, a second keyword is extracted from a second signal received within a predetermined period of time, and the channel map is searched to find whether there is a channel number corresponding to the extracted second keyword, and a control command to change the channel to the searched channel number is generated (S740).

Further, the stored first keyword is added as a pseudo channel name for the searched channel number (S750). Here, the pseudo channel names may include channel names having possibility of being uttered by the user to indicate the channel name except for the channel name.

In this case, the degree of similarity between the stored first keyword and the extracted second keyword may be determined, and if the determined similarity is greater than the predetermined threshold value, the stored first keyword may be added as a pseudo channel name for the channel number searched according to the second keyword.

Meanwhile, channel change may be made to the searched channel number based on the control command, and the broadcasting program being provided in the changed channel may be displayed on the display of the electronic device.

Further, if a keyword extracted from a third signal received after the extracted first keyword is added as a pseudo channel name is identical to the first keyword, the channel number corresponding to the extracted keyword may be searched in the channel map based on the first keyword added as a pseudo channel name, and a control command to change the channel to the searched channel number may be generated.

Meanwhile, the first keyword may be transmitted, and the server may update the channel map stored in the server using the first keyword.

In this case, when the first keyword is received for a predetermined number of times or more from the electronic device and the plurality of electronic devices, the channel map stored in the server may be updated using the first keyword.

Meanwhile, the method for updating, by the electronic device, the channel map through the keyword included in a previous uttered voice using the uttered voice for which channel change has been controlled, was specifically explained hereinabove.

Meanwhile, there may be provided a non-transitory computer readable medium, where a program for sequentially performing the method for updating the channel map according to the present disclosure may be stored.

A non-transitory computer readable medium is not a medium that stores data for a short period of time, such as a register, cache, memory and the like, but a medium configured to store data semi-permanently, and that may be read by a device. Specifically, the aforementioned various applications or programs may be stored in a non-transitory computer readable medium, such as a CD, DVD, hard disk, blue ray disk, USB, memory card, ROM and the like.

Further, although buses are not illustrated in the aforementioned block diagrams illustrating the server and electronic device, in the server and electronic device, communication between each element may be performed through buses. Further, the server and the electronic device may further include a processor such as a CPU, microprocessor and the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device, comprising:
   a communicator;
   a storage configured to store a channel map including a channel name and a channel number corresponding to the channel name; and
   a processor configured to:
      obtain a keyword from a first voice command received through the communicator;
      based on a channel name corresponding to the keyword not being identified in the channel map, store the keyword as a first keyword;
      based on a second voice command being received through the communicator within a predetermined time from a time when the first voice command is received, obtain a second keyword that is different from the first keyword from the second voice command;
      identify a channel name corresponding to the second keyword in the channel map, select a channel number corresponding to the identified channel name and add the first keyword to the channel map as a pseudo channel name for the selected channel number; and
      based on the second voice command being not received within the predetermined time, delete the stored first keyword.

2. The electronic device according to claim 1, wherein the processor is further configured to control the storage to temporarily store the first keyword.

3. The electronic device according to claim 1, further comprising a buffer,
   wherein the processor is further configured to store the first keyword in the buffer.

4. The electronic device according to claim 1, wherein the processor is further configured to identify a degree of similarity between the first keyword and the second keyword, and add the first keyword as the pseudo channel name for the selected channel number based on the degree of similarity being greater than a predetermined threshold value.

5. The electronic device according to claim 1, further comprising a display,
   wherein the processor is further configured to tune the selected channel number based on a control command, and control a broadcasting program provided from the selected channel number to be displayed on the display.

6. The electronic device according to claim 1, wherein the processor is further configured to identify whether the first keyword is identical to a third keyword extracted from a third voice command received through the communicator after the first keyword is added as the pseudo channel name, search the channel map for the channel number corresponding to the first keyword added as the pseudo channel name, and generate a control command to change to the selected channel number.

7. The electronic device according to claim 1, wherein the processor is further configured to control the communicator to transmit the first keyword to a server based on the first keyword being added to the channel map as the pseudo channel name, and
   wherein the server is configured to update the channel map stored in the server using the first keyword.

8. The electronic device according to claim 7, wherein the server is further configured to update the channel map stored in the server using the first keyword based on the first keyword being received at least a predetermined number of times.

9. The electronic device according to claim 1, wherein the pseudo channel name for the selected channel number is different from the identified channel name.

10. A method, performed by an electronic device, for updating a channel map including a channel name, a broadcasting frequency corresponding to the channel name, and a channel number corresponding to the channel name, the method comprising:
    receiving a first voice command;
    obtaining a keyword from the first voice command;
    based on a channel name corresponding to the keyword not being identified in the channel map, storing the keyword as a first keyword;
    receiving a second voice command;
    based on the second voice command being received within a predetermined time from a time when the first voice command is received, obtaining a second keyword that is different from the first keyword from the second voice command;
    identifying a channel name corresponding to the second keyword in the channel map, selecting a channel number corresponding to the identified channel name and adding the first keyword to the channel map as a pseudo channel name for the selected channel number; and
    based on the second voice command being not received within the predetermined time, deleting the stored first keyword.

11. The method according to claim 10, wherein the storing comprises temporarily storing the first keyword.

12. The method according to claim 10, wherein the storing comprises storing the first keyword in a buffer of the electronic device.

13. The method according to claim 10, wherein the adding comprises identifying a degree of similarity between the first keyword and the second keyword; and
    adding the first keyword as the pseudo channel name for the selected channel number based on the degree of similarity being greater than a predetermined threshold value.

14. The method according to claim 10, further comprising:
    changing to the selected channel number based on a control command; and
    displaying a broadcasting program provided from the selected channel number on a display of the electronic device.

15. The method according to claim 10, further comprising:
    identifying whether the first keyword is identical to a third keyword extracted from a third voice command received after the first keyword is added as the pseudo channel name;
    searching the channel map for the channel number corresponding to the first keyword added as the pseudo channel name; and
    generating a control command to change to the selected channel number.

16. The method according to claim 10, further comprising transmitting the first keyword to a server based on the first keyword being added to the channel map as the pseudo channel name, wherein the server updates the channel map stored in the server using the first keyword.

17. The method according to claim 16, wherein the server updates the channel map stored in the server using the first keyword based on the first keyword being received at least a predetermined number of times.

18. The method according to claim 10, wherein the pseudo channel name for the selected channel number is different from the identified channel name.

19. A non-transitory computer readable recording medium having embodied thereon a program, which when executed by a processor of an electronic device causes the electronic device to execute a method for updating a channel map including a channel name, a broadcasting frequency corresponding to the channel name, and a channel number corresponding to the channel name, the method including:

receiving a first voice command;

obtaining a keyword from the first voice command;

based on a channel name corresponding to the keyword not being identified in the channel map, storing the keyword as a first keyword;

receiving a second voice command;

based on the second voice command being received within a predetermined time from a time when the first voice command is received, obtaining a second keyword that is different from the first keyword from the second voice command;

identifying a channel name corresponding to the second keyword being identified in the channel map, selecting a channel number corresponding to the identified channel name and adding the first keyword to the channel map as a pseudo channel name for the selected channel number; and based on the second voice command being not received within the predetermined time, deleting the stored first keyword.

\* \* \* \* \*